United States Patent [19]

Nogami

[11] 4,223,956
[45] Sep. 23, 1980

[54] HYDRAULIC BRAKE PRESSURE CONTROL DEVICE FOR VEHICLE BRAKING SYSTEMS

[75] Inventor: Tomoyuki Nogami, Toyota, Japan

[73] Assignee: Toyota Jidosha Kogyo Kabushiki Kaisha, Aichi, Japan

[21] Appl. No.: 21,766

[22] Filed: Mar. 19, 1979

[30] Foreign Application Priority Data

Nov. 28, 1978 [JP] Japan .................................. 53-146826

[51] Int. Cl.³ ............................................... B60T 8/14
[52] U.S. Cl. .................................. 303/24 C; 303/22 R
[58] Field of Search ................. 303/6 C, 22 R, 24 A, 303/24 C, 24 F

[56] References Cited

U.S. PATENT DOCUMENTS

| | | | |
|---|---|---|---|
| 3,994,533 | 11/1976 | Ohta | 303/6 C |
| 4,163,588 | 8/1979 | Nogami | 303/24 C |

FOREIGN PATENT DOCUMENTS 1079507  8/1967  United Kingdom .................. 303/24 C Primary Examiner—Duane A. Reger
Attorney, Agent, or Firm—Oblon, Fisher, Spivak, McClelland & Maier

[57] ABSTRACT

An hydraulic brake pressure control device comprises an inertia-controlled valve for interrupting fluid communication between a master cylinder and rear wheel brake cylinders at a deceleration in excess of a predetermined value and a differential piston for gradually increasing the hydraulic pressure trapped within the wheel brake cylinders after the valve is closed. In this type of control device, resilient means is arranged to regulate axial movements of the differential piston in accordance with loaded conditions of the vehicle.

3 Claims, 4 Drawing Figures

HYDRAULIC BRAKE PRESSURE CONTROL DEVICE FOR VEHICLE BRAKING SYSTEMS

BACKGROUND OF THE INVENTION

The present invention relates to hydraulic brake pressure control devices for vehicle braking systems, and more particularly to an improved hydraulic brake pressure control device of the type which comprises an inertia-controlled valve for interrupting fluid communication between a master cylinder and rear wheel brake cylinders at a deceleration in excess of a predetermined value and a differential piston for gradually increasing the fluid pressure trapped within the wheel brake cylinders after the valve is closed.

SUMMARY OF THE INVENTION

The primary object of the present invention is to provide an improved hydraulic brake pressure control device wherein axial movements of the differential piston are controlled by resilient forces acting on the piston in accordance with loaded conditions of the vehicle to make the braking force distribution ratio between the front and rear wheel brakes as close as possible the ideal distribution ratio.

According to the present invention there is provided hydraulic brake pressure control device for a vehicle braking system incorporating between a master cylinder and wheel brake cylinders, which device comprises:

a housing adapted to be mounted on a vehicle body frame, the housing being provided thereon with an inlet port for connection to the master cylinder and an outlet port for connection to the wheel brake cylinders and being provided therein with a stepped bore having a small diameter portion and a large diameter portion spaced therefrom, the bore being in communication with the inlet and outlet ports respectively at the small and large diameter portions thereof, and an inner bore in communication with the small and large diameter portions of the stepped bore at opposite sides thereof;

a differential piston having small and large diameter portions reciprocably disposed within the respective small and large diameter portions of the stepped bore to provide first and second fluid chambers respectively in open communication with the inlet and outlet ports, the piston being exposed at its small diameter portion in the first chamber and at its large diameter portion in the second chamber;

first and second coil springs concentrically assembled within said space between the small and large diameter portions of the stepped bore, the first spring being loaded to regulate the axial movement of the piston toward the first chamber from an usual position, and the second spring being loaded to regulate the axial movement of the piston toward the second chamber from the usual position; and, cut-off valve means including a valve seat provided on a wall of the inner bore to permit fluid flow between the first and second chambers and an inertia-controlled valve element housed within the inner bore to co-operate with the valve seat to interrupt the flow of fluid from the first chamber to the second chamber when the valve element is subjected to a deceleration in excess of a predetermined value.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
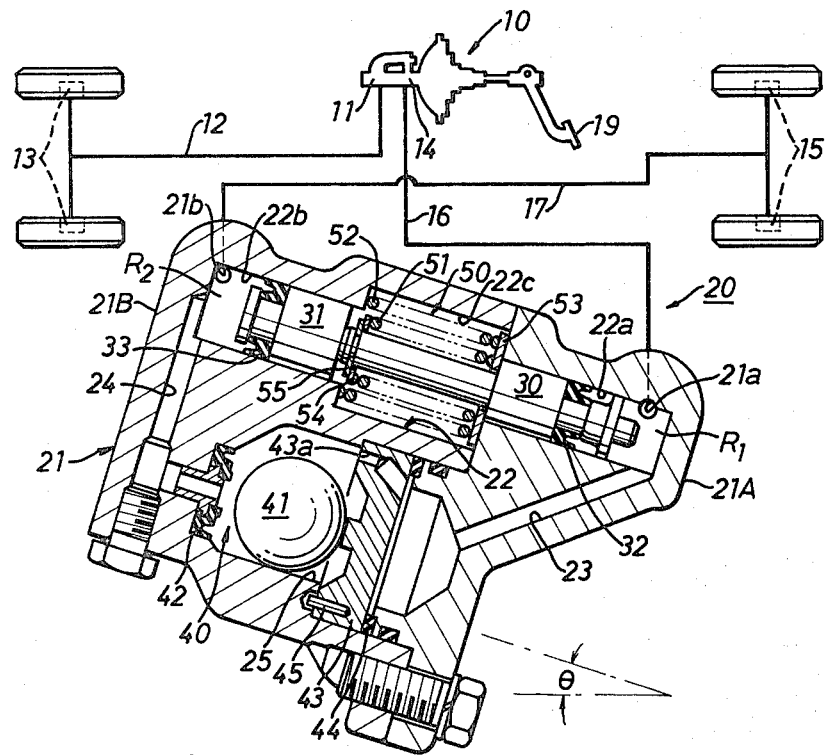
FIG. 1 illustrates a vehicle braking system including an hydraulic brake pressure control device in accordance with the present invention.

Referring now to the drawings, particularly in FIG. 1 there is illustrated a conventional tandem master cylinder 10 which is operated by depression of a foot brake pedal 19. The master cylinder 10 is provided with a front pressure chamber 11 connected to front wheel brake cylinders 13 by way of a conduit 12 and a rear pressure chamber 14 connected to rear wheel brake cylinders 15 by way of conduits 16 and 17. Interposed between the conduits 16 and 17 is an hydraulic brake pressure control device 20 of inertia responsive type in accordance with the present invention.

The control device 20 is fixedly mounted under the vehicle body floor (not shown) at an inclined angle $\theta$. The control device 20 comprises a housing assembly 21 which is provided therein with a small diameter piston 30, a large diameter piston 31 and an inertia-controlled ball 41. The housing assembly 21 includes a rear housing 21A provided with an inlet port 21a and a front housing 21B provided with an outlet port 21b. The inlet port 21a is connected to the rear pressure chamber 14 of master cylinder 10 by way of the conduit 16. The outlet port 21b is connected to the rear wheel brake cylinders 15 by way of the conduit 17. Within the housing assembly 21, there are provided in parallel a stepped cylindrical bore 22 includes a small diameter portion 22a into which the inlet port 21a opens, a large diameter portion 22b into which the outlet port 21b opens, and an intermediate bore 22c in which resilient means 50 is assembled. An inner bore 25 communicates with the small and large diameter portions 22a and 22b of stepped bore 22 by way of a first passage 23 and a second passage 24 respectively.

The small diameter piston 30 is in the form of a stepped piston which is reciprocably engaged within the small diameter portion 22a of stepped bore 22 via an annular seal member 32 to form a first fluid chamber $R_1$ into which the inlet port 21a opens directly. The first fluid chamber $R_1$ is connected to the inner bore 25 by way of the first passage 23. The large diameter piston 31 is reciprocably engaged within the large diameter portion 22b of stepped bore 22 via an annular seal member 33, and it is in engagement with a smaller end of the piston 30. A second fluid chamber $R_2$ formed by the piston 31 is in open communication with the outlet port 21b and is connected to the inner bore 25 by way of the second passage 24.

The resilient means 50 comprises first and second coil springs 51 and 52 which are concentrically assembled within the intermediate bore 22c. The first coil spring 51 is loaded to regulate the axial movement of the piston 30 toward the first fluid chamber $R_1$ from an usual position. The first spring 51 is engaged at its one end with the smaller end of piston 30 through an annular retainer 54 and a clip fastener 55 and at its other end with an inner shoulder of the bore space 22c through an annular retainer 53. The second coil spring 52 is loaded to regulate the axial movement of the piston 30 toward the second fluid chamber $R_2$ from the usual position. The second spring 52 is engaged at its one end with the opposite inner shoulder of bore space 22c and at its other end with the annular retainer 53. Thus, the annular retainer 53 is detachably engaged with the first piston 30 and constantly engages the first and second coil spring 51 and 52.

The inertia-controlled ball 41 housed within the inner bore 25 is free to roll forwardly up the inclined bottom of bore 25 and co-operates with an annular valve seat 42 secured to the side wall of bore 25 to provide a cut-off valve 40. The ball 41 normally rests under gravity in the position shown in the drawing and is received by a support plate 43 which is sandwitched between the rear and front housings 21A and 21B through an annular seal member 44. The support plate 43 is secured in position by a knock pin 45 and is also provided at its upper portion with an orifice 43a. In braking operation, when the rate of deceleration caused by the application of the brakes exceeds a predetermined value, the ball 41 will roll forwardly due to the inertia force acting thereon toward the valve seat 42 so that the cut-off valve 40 is closed to interrupt fluid communication between the first and second fluid chambers $R_1$ and $R_2$.

Hereinafter the mode of operation of the control device 20 will be described in detail. Under the unloaded condition of the vehicle, depression of the brake pedal 19 produces fluid pressure within the respective pressure chambers 11 and 14 of master cylinder 10. The pressure in the front pressure chamber 11 is applied directly to the front wheel brake cylinders 13 through the conduit 12, and the pressure in the rear pressure chamber 14 is applied to the inlet port 21a of the control device 20 through the conduit 16. The master cylinder pressure $P_m$ applied to the inlet port 21a is applied to the second chamber $R_2$ via the first chamber $R_1$, the first passage 23, the inner bore 25, the valve seat 42 and the second passage 24 in sequence and, then, applied to the rear wheel brake cylinders 15 through the outlet port 21b and the conduit 17 to operate the rear wheel brakes. Thus, the vehicle is braked in accordance with the value of the master cylinder pressure applied to the front and rear wheel brake cylinders 13 and 15.

During the braking operation, within the control device 20, the small diameter piston 30 is urged forwardly by the pressure in the first chamber $R_1$, while the large diameter piston 31 is urged rearwardly by the pressure in the second chamber $R_2$. In this instance, the pistons 30, 31 are urged toward the first chamber $R_1$ due to a difference between pressures acting thereon, but they are held in the usual position, since the urging force is still smaller than the setting load of the first coil spring 51. When the master cylinder pressure $P_m$ increases up to a value $P_1$, the rate of deceleration will exceed a predetermined value $g_0$. Then, the ball 41 rolls forwardly toward the valve seat 42 due to the inertia force acting thereon so that the cut-off valve 40 is closed to interrupt the fluid communication between the first and second chambers $R_1$ and $R_2$, which is indicated by a character A in FIG. 2. At this stage, a difference between pressures acting on the pistons 30, 31 will balance with the setting load of the first spring 51. When the master cylinder pressure $P_m$ reaches a value $P_3$, a difference between pressures acting on the pistons 30, 31 will also balance with the setting load of the second spring 52. During this operation, the pistons 30 and 31 do not move forwardly, and the ball 41 is held on the valve seat 42 due to the inertia and the difference in pressure between the first and second chambers $R_1$ and $R_2$. Thus, the pressure $P_w$ in the second chamber $R_2$ and the rear wheel brake cylinders 15 does not increase, as indicated by a segment line between characters A and B in FIG. 2.

When the master cylinder pressure $P_m$ further increases by continued depression of the brake pedal 19, the pressure acting on the small diameter piston 30 moves the large diameter piston 31 toward the second chamber $R_2$ against biasing force of the second spring 52. The large diameter piston 31 acts on the fluid trapped in the conduit 17 to the rear wheel brake cylinders 15 due to the closing of the cut-off valve 40 and increases the pressure in the conduit 17, but owing to the difference between the effective pressure receiving areas of the pistons 30 and 31 and the setting load of the second spring 52, the rate of increase is less than the rate of increase in the master cylinder pressure $P_m$, as shown by a segment line between characters B and C in FIG. 2. The pressure increase will be discontinued by abutment of the piston 31 against the forward end wall of the stepped bore 22 to maintain the rear wheel cylinder pressure $P_w$ in a high value.

Under the loaded condition of the vehicle, depression of the brake pedal 19 applies the master cylinder pressure from the master cylinder 10 to the front and rear wheel brake cylinders 13 and 15 to effect the braking effort in the same process ad described above. In this braking operation, even when the master cylinder pressure $P_m$ increases up to the value $P_1$, the rate of deceleration does not reach the predetermined value $g_0$ due to the heavy load of the vehicle, and at this stage, a difference between pressures acting on the pistons 30, 31 will balance with the setting load of the first spring 51. Subsequently, the pistons 30, 31 are moved towards the first chamber $R_1$ against biasing force of the first spring 51 in response to increase of the master cylinder pressure $P_m$. When the master cylinder pressure $P_m$ increases up to a value $P_2$ the rate of deceleration reaches the predetermined value $g_0$ to roll the ball 41 forwardly towards the valve seat 42. This closes the cut-off valve 40 to interrupt the fluid communication between the first and second chambers $R_1$ and $R_2$, which is indicated by a character D in FIG. 2.

If the master cylinder pressure $P_m$ is further increased by continued depression of the brake pedal 19, the pressure acting on the small diameter piston 30 moves the large diameter piston 31 toward the second chamber $R_2$. The large diameter piston 31 acts on the fluid trapped in the conduit 17 to the rear wheel brake cylinder 15 due to the closing of the cut-off valve 40 and increases the pressure in the conduit 17, but, owing to the difference between the effective pressure receiving areas of the pistons 30, 31 and the spring constant of the first spring 51, the rate of increase is less than the rate of increase in the master cylinder pressure $P_m$, as shown by a segment line between characters D and E in FIG. 2. The pressure control will continue until the piston 30 is engaged at its inner shoulder with the retainer 53. When the piston 30 is engaged at its inner shoulder with the retainer 53, the forward movement of the piston 30 is restricted by resilient force of the second spring 52 such that the pressure increase in the second chamber $R_2$ is temporarily discontinued to control the rear wheel cylinder pressure $P_w$, as shown by a segment line between characters E and F in FIG. 2. Thereafter, the rear wheel cylinder pressure $P_w$ will be controlled in the same process as previously described.

Figure 2:
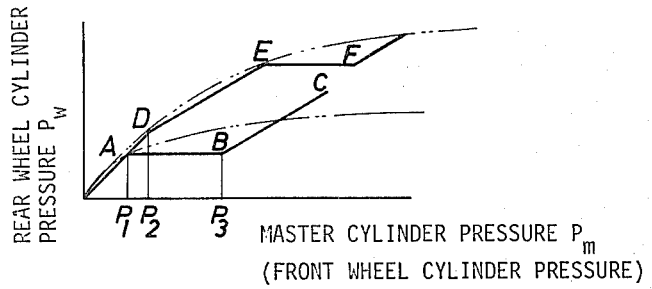
FIG. 2 is a graph indicating the pressure controlling characteristics of the control device.

In the above described embodiment, the spring constant of the first spring 51 is determined in a value equal to that of the second spring 52 so that each gradient of the segment line B—C and the extended line above the point F coincides with the gradient of the segment line D—E in FIG. 2. In addition, each pre-load of the first and second springs 51 and 52 is appropriately selected to make the braking force distribution ratio between the front and rear wheel brakes as close as possible ideal characteristic curves indicated by imaginary lines in FIG. 2. Furthermore, each length of the segment line A—B and E—F and each gradient of the segment line B—C and the extended line above the point F may be appropriately determined by spring constant and pre-load of the second spring 52, and the length and gradient of the segment line D—E may be determined by spring constant and pre-load of the first spring 51.

Figure 3:
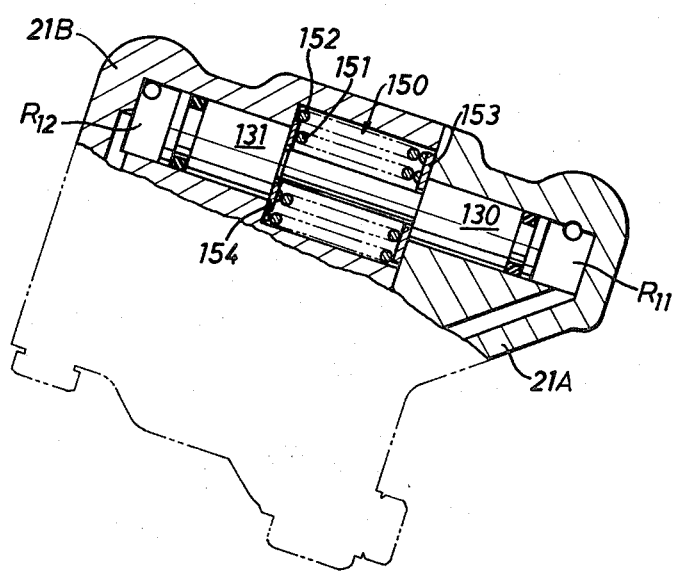
FIG. 3 illustrates a partial section of another embodiment of the present invention.

In FIG. 3, there is illustrated another embodiment of the present invention which includes pistons 130, 313 and resilient means 150, respectively corresponding with the pistons 30, 31 and the resilient means 50 of the previous embodiment. The resilient means 150 includes a first coil spring 151 of small diameter and a second coil spring 152 of large diameter, which are concentrically assembled. The first coil spring 151 is engaged at its one end with the inner shoulder of the rear housing 21A through an annular retainer 153 and at its other end with the inner shoulder of the front housing 21B through an annular retainer 154. Thus, the first coil spring 151 is compressed with a predetermined load to regulate reciprocating movements of the pistons 130, 131. The second coil spring 152 is engaged at its one end with the retainer 153 and at its other end with the inner shoulder of the front housing 21B. Thus, the second coil spring 152 is compressed with a predetermined load to regulate forward movement of the piston 130. In addition, the retainer 154 constantly engages the first coil spring 151 and is detachably engaged with an inner shoulder of the piston 131 and the inner shoulder of the front housing 21B. Other construction of this embodiment is the same as that of the previous embodiment.

Figure 4:
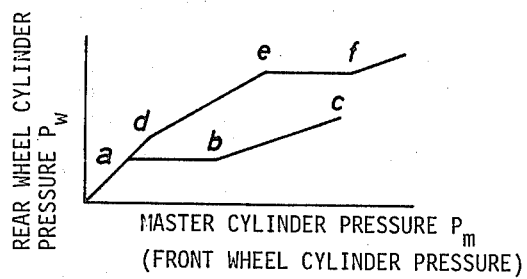
FIG. 4 is a graph indicating the pressure controlling characteristics of the embodiment of FIG. 3.

With the embodiment of FIG. 4, each length of segment lines a—b and e—f and each gradient of a segment line b—c and an extended line above point f may be determined by respective spring constants and pre-loads of the first and second springs 151 and 152. The length and gradient of a segment line d—e may be determined by spring constant and pre-load of the first spring 151. Thus, the forward movement of the pistons toward a second fluid chamber $R_{12}$ is regulated by resilient forces of the first and second springs 151 and 152. Other operational function of the embodiment is substantially the same as that of the previous embodiment.

Although certain specific embodiments of the present invention have been shown and described, it is obvious that many modifications and variations thereof are possible in light of these teachings. For example, the above noted pistons 30 and 31 may be integrally formed to provide a single differential piston. It is to be understood therefore that within the scope of the appended claims, the invention may be practiced otherwise than as specifically described herein.

What is claimed is:

1. In an hydraulic brake pressure control device for a vehicle braking system incorporating between a master cylinder and wheel brake cylinders, comprising:

a housing adapted to be mounted on a vehicle body frame, said housing being provided thereon with an inlet port for connection to said master cylinder and an outlet port for connection to said wheel brake cylinders and being provided therein with a stepped bore having a small diameter portion and a large diameter portion, said stepped bore being in communication with said inlet and outlet ports respectively at the small and large diameter portions thereof, and an inner bore in communication with the small and large diameter portions of said stepped bore at opposite sides thereof;

a differential piston having small and large diameter portions reciprocably disposed within the respective small and large diameter portions of said stepped bore to provide first and second fluid chambers respectively in open communication with said inlet and outlet ports, said piston being exposed at its small diameter portion in said first chamber and at its large diameter portion in said second chamber;

resilient means for regulation axial movements of said differential piston; and cut-off valve means including a valve seat provided on a wall of said inner bore to permit fluid flow between said first and second chambers and an inertia-controlled valve element housed within said inner bore to co-operate with said valve seat to interrupt the flow of fluid from said first chamber to said second chamber when said valve element is subjected to a deceleration in excess of a predetermined value;

the improvement wherein said housing includes a space between the small and large diameter portions of said stepped bore, and said resilient means comprises first and second coil springs concentrically assembled within said space, said first spring being loaded to regulate the axial movement of said piston towards said first fluid chamber from the usual position, and said second spring being loaded to regulate the axial movement of said piston toward said second fluid chamber from the usual position.

2. An hydraulic brake pressure control device as claimed in claim 1, wherein the diameter of said space is larger than the large diameter portion of said stepped bore to form a pair of inner shoulders at opposite ends of said space, said first spring is engaged at its one end with a portion of said piston and at its other end with one of said inner shoulders through a retainer to bias said piston axially toward said second fluid chamber, said second spring is engaged at its one end with said retainer and at its other end with the other one of said inner shoulders to bias siad piston axially toward said first fluid chamber, and said retainer is detachably engaged with the small diameter portion of said piston.

3. An hydraulic brake pressure control device as claimed in claim 1, wherein the diameter of said space is larger than the large diameter portion of said stepped bore to form a pair of inner shoulders at opposite ends of said space, said first spring is engaged at opposite ends thereof with said pair of inner shoulders of said housing through a pair of retainers, said piston is detachably engaged at the small and large diameter portions thereof with each of said retainers, and said second spring is engaged at its one end with one of said inner shoulders and at its other end with one of said retainers to bias said piston axially toward said first fluid chamber.

* * * * *